United States Patent [19]
Ben-Shmuel

[11] Patent Number: 4,545,296
[45] Date of Patent: Oct. 8, 1985

[54] CENTRIFUGAL APPARATUS FOR MAKING COFFEE

[76] Inventor: Sonja Ben-Shmuel, 1031 Ardsley Rd., Schenectady, N.Y. 12308

[21] Appl. No.: 622,116

[22] Filed: Jun. 19, 1984

[51] Int. Cl.[4] ............................................. A47J 31/22
[52] U.S. Cl. ............................. 99/289 P; 99/302 C
[58] Field of Search ...................... 99/279, 287, 289 P, 99/289 R, 302 R, 302 C, 289 D; 426/433

[56] References Cited

U.S. PATENT DOCUMENTS

| | | |
|---|---|---|
| 135,544 | 2/1873 | Grigsby . |
| 177,173 | 5/1876 | Theobald . |
| 204,099 | 5/1878 | Schmitz . |
| 412,667 | 10/1889 | Richards . |
| 871,492 | 11/1907 | Dunlap . |
| 1,108,288 | 8/1914 | Watson . |
| 1,572,861 | 2/1926 | Larrey . |
| 1,984,047 | 12/1934 | Thieme . |
| 2,146,108 | 2/1939 | Conrad . |
| 2,858,762 | 11/1958 | Wade ................................. 99/287 |
| 3,025,781 | 3/1962 | Bossi ................................. 99/302 |
| 3,233,535 | 2/1966 | Fowlie ............................. 99/289 |
| 3,564,991 | 2/1971 | Longinotti ....................... 99/289 |
| 3,590,723 | 7/1971 | Dokus ............................. 99/289 |
| 4,211,156 | 7/1980 | Zimmermann ................... 99/287 |

FOREIGN PATENT DOCUMENTS 566623  5/1931  Fed. Rep. of Germany .

*Primary Examiner*—Robert W. Jenkins
*Attorney, Agent, or Firm*—Kirschstein, Kirschstein, Ottinger & Israel

[57] ABSTRACT

An apparatus for making coffee includes a housing which bounds a catch chamber provided with a discharge through which any liquid present in the catch chamber is discharged into a receptacle, so that a rotary body which is mounted in the catch chamber for rotation about an axis rotates in air. The rotary body includes an internal space which is subdivided by a partition into two compartments which communicate with one another at their outer ends. Liquid is discharged from one of the compartments into the catch chamber through a port situated at the inner end of such compartment, while hot liquid is introduced into the inner end of the other compartment and flows therethrough and the quantity of ground coffee contained therein to extract flavor from the latter. The rate of discharge is determined solely by the rate of replenishment, since the two compartments behave as connected vessels or a water trap. The ground coffee may be confined in an outer envelope of filter material, to form a unitary cartridge therewith which can be introduced as a unit into the other compartment through the lower end thereof, after a movable end wall of the rotary body has been moved out of the way.

7 Claims, 4 Drawing Figures

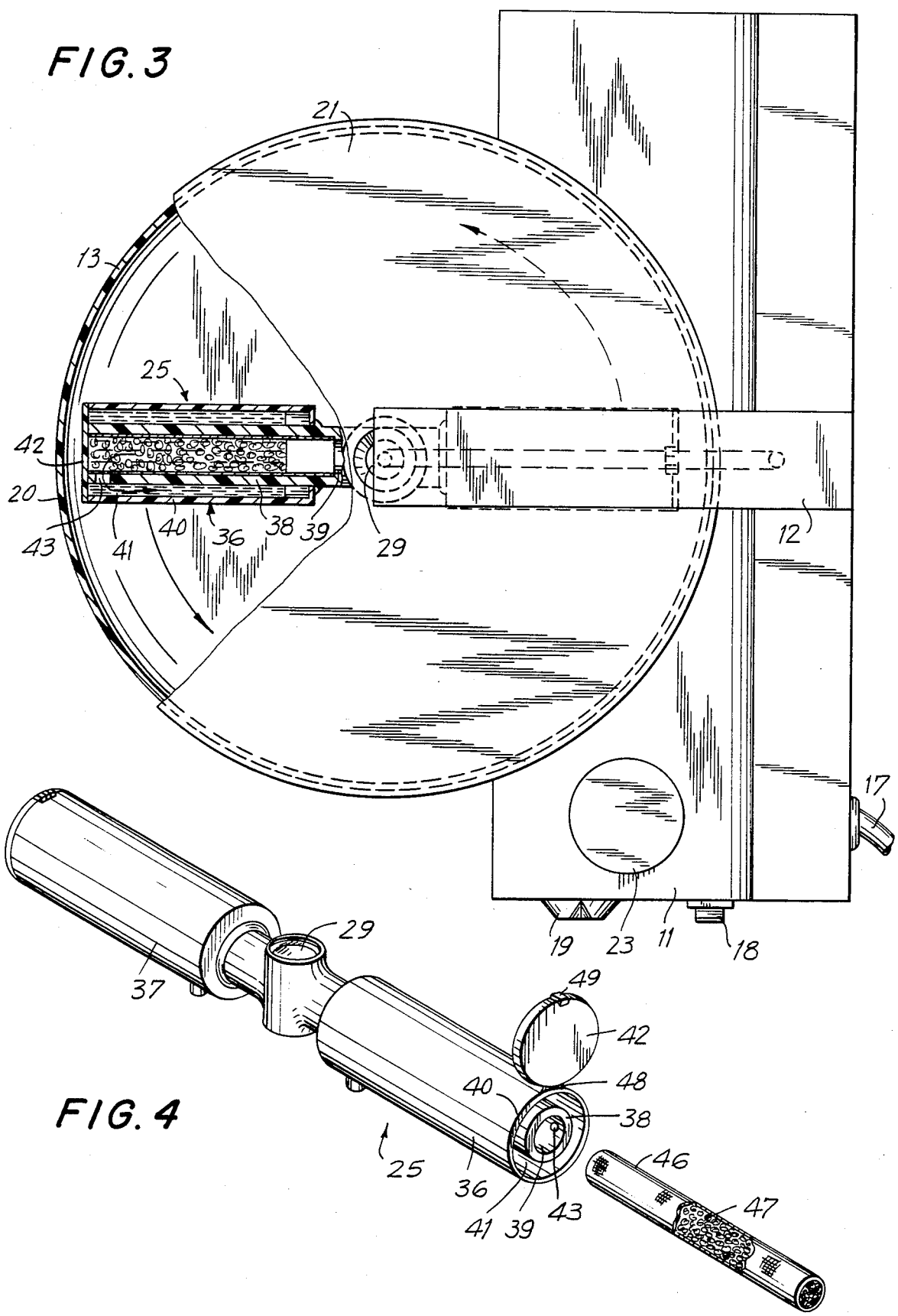

CENTRIFUGAL APPARATUS FOR MAKING COFFEE

BACKGROUND OF THE INVENTION

The present invention relates to the making of hot beverages in general and, more particularly, to a method of and an apparatus for making coffee by using a continuous flow technique.

There are known various ways of making coffee which vary from country to country or from one geographical region to another in dependence on taste preferences of the population. Some of the most popular ways of making coffee in this country, if pouring hot water into a container containing a quantity of so-called instant coffee is disregarded, are a percolating technique, and a drip technique. When performing the percolating technique, hot water or steam is repeatedly passed through a quantity of ground coffee until it extracts the coffee flavor from the ground coffee. However, because of the numerous passes of the boiling water or steam through the same quantity of coffee, some undesirable taste ingredients may be extracted from the ground coffee as well so that the beverage has less than an optimum or desirable taste. Therefore, the drip technique is preferred by many people, since it extracts the coffee flavor but not the undesirable taste components.

In performance of the drip technique, water closely below its boiling temperature is passed through a quantity of ground coffee only once. However, as the water passes through the ground coffee quantity, it follows the path or paths of least resistance, that is, it flows through the largest interstices present in the coffee quantity, or forms such relatively large interstices as it flows through the coffee quantity. This means that certain areas of the quantity of ground coffee will be bypassed by the flow of the hot water, or will be exposed to only a small degree of extraction of the coffee flavor therefrom during the passage of the hot water through the coffee quantity. To avoid the possibility that this preferential flow of the hot water would result in too small an amount of the coffee flavor in the beverage, the suppliers of coffee pouches for the drip-type coffee machines include an excess quantity of coffee in their pouches, and the suppliers of cans of coffee for use in drip-type coffee machines recommend the use of an excessive amount of coffee by the consumer as well. This, of course, is very wasteful but unavoidable lest the flavor of the coffee beverage be compromised.

To remedy these deficiencies, it was proposed, for instance, in the U.S. Pat. No. 3,025,781, to confine a quantity of coffee in an annular space of a rotary member which rotates about a vertical axis onto which the annular space is centered at least during the introduction of hot or warm water into the annular space through a central inlet opening provided in a shaft on which the rotary member is mounted for joint rotation therewith. As the water emerges from the inlet opening, centrifugal forces attributable to the rotation of the rotary member and acting on the water during and after its emergence causes the water to flow in a path having at least a component in the radially outward direction, so that the hot water will flow through the quantity of ground coffee present in the annular space and extract aromatic substances and other solubles therefrom. Then, the thus obtained coffee extract or beverage flows out of the annular space through perforations or openings provided in the peripheral edge portion of the rotary member. In this arrangement, water flows through the quantity of coffee only once, on its way from the central inlet toward the peripheral perforations, without being returned, so that the danger of acquisition of undesirable taste by the beverage is avoided. Additionally, the centrifugal forces caused by the rotation of the rotary member will also act on the quantity of coffee present in the annular space of the rotary member, so that the ground coffee will be somewhat compacted and thus undesirably large interstices will be avoided.

However, experience with this type of equipment has shown that the dwell time of the water in the annular space, which is determinative of the amount of extracted aromatic and other soluble substances, is usually too short for completely extracting the requisite amount of the substances, be it because the rotating speed is too small to achieve the requisite reduction in the size of the interstices, or because the rotating speed is too high so that the centrifugal forces cause the water to penetrate through the ground coffee too rapidly, despite the aforementioned compaction of the ground coffee. Although the aforementioned compaction tends to prevent the large interstices from forming, some channeling and bypassing of the coffee grounds takes place, especially along the walls bounding the annular space of the rotary member. A coffee making apparatus operative to lessen the channeling and bypassing problem is described in pending U.S. application Ser. No. 439,376, filed Nov. 5, 1982, by Dan Ben-Shmuel, and entitled METHOD AND APPARATUS FOR MAKING COFFEE now abandoned.

SUMMARY OF THE INVENTION

Accordingly, it is a general object of the present invention to avoid the disadvantages of the prior art.

More particularly, it is an object of the present invention to provide a coffee making apparatus which does not possess the disadvantages of the conventional apparatus of this type.

Still more particularly, it is an object of the invention to provide an apparatus of the type here under consideration which requires the use of a much lesser amount of ground coffee than the excessive amount currently used in drip-type apparatus for achieving the presence of the desired amount of coffee flavor in the beverage.

It is yet another object of the present invention to so construct the apparatus of the above type as to be simple in construction, inexpensive to manufacture, easy to use, and reliable in operation nevertheless.

A concomitant object of the present invention is to devise a novel method of making coffee, which results in complete extraction of the coffee flavor from the ground coffee, without causing undesirable taste of the beverage obtained thereby.

In pursuance of these objects and others which will become apparent hereafter, one feature of the present invention resides in a coffee-making apparatus which comprises a housing bounding a catch chamber; a rotary body mounted with clearance in the catch chamber for rotation in air about an axis, bounding a centrally located recess and at least one enclosed internal space extending outwardly from the recess, and including substantially radially extending partitioning wall means subdividing the internal space into at least two compartments each of which has an inner and an outer end portion as considered in the radial direction, the inner end portion of at least one of the compartments opening into the recess, and the compartments being in communication with one another at their outer end portions, the rotary body further including outlet port means arranged at the inner end portion of the other of the compartments, this outlet port establishing communication between the other compartment and the catch chamber. The apparatus further comprises means for introducing ground coffee into the one compartment, means for rotating the body in air about the axis of rotation thereof to subject the contents of the two compartments to the influence of centrifugal forces; means for delivering hot liquid into the recess at least during the operation of the rotating means for the liquid to flow under the influence of the centrifugal forces into and through the one compartment and the quantity of coffee present in such one compartment, with attendant formation of a coffee beverage, and for the coffee beverage to gradually fill the other compartment from the outer end portion to the outlet port means, also under the influence of the centrifugal forcess, and to be discharged through the outlet port means only after reaching the same. The apparatus further includes a receptacle for the coffee discharged from the outlet port means, and means for continuously discharging the coffee beverage from the catch chamber into the receptacle to prevent accumulation of such beverage in the catch chamber.

A particular advantage of the arrangement as described so far is that the rate of flow of the liquid through the ground coffee, even though a continuous flow process is being used in which the coffee is subjected to centrifugal forces, is determined solely by the rate at which additional liquid is introduced into the one compartment, rather than by the centrifugal forces. Hence, it is possible by resorting to the present invention to accurately control the dwell time of the liquid in contact with the ground coffee, and thus the degree of extraction of solubles from the coffee, by controlling the rate of admission of the hot liquid.

According to a currently preferred aspect of the present invention, the rotary body has a substantially cylindrical configuration centered on a central axis normal to the axis of rotation and including an outer jacket. Then, the partitioning wall means is advantageously constructed as a tubular portion centered on the central axis, the tubular portion outwardly bounding the one compartment and being surrounded by the other compartment that is outwardly delimited by the jacket.

In this respect, it is further advantageous when the outer jacket includes a circumferential wall and an end wall, the end wall being separate from the circumferential wall and movably retained thereon. The jacket may further advantageously include hinge means which connects the end wall to the circumferential wall of the jacket for pivoting relative thereto. This is particularly advantageous when the introducing means includes, according to another concept of the present invention, a cartridge comprising an outer envelope of a material pervious to liquids but impervious to coffee grounds, the cartridge further comprising a body of coffee grounds confined in the outer envelope, the cartridge being introducible into the one compartment as a unit through the outer end portion when the end wall of the jacket is moved out of the way.

The present invention is also directed to a method of making coffee, this method comprising the steps of confining a body of ground coffee in one compartment of a rotary body which is mounted for rotation about an axis extending transversely of the one compartment, this one compartment being adjoined by another compartment, the outer ends of the compartments as considered in the radial direction relative to the axis of rotation communicating with one another, and the inner ends of the compartment being also located next to one another; rotating the rotary body about the axis to subject the contents of the compartments to centrifugal force; introducing hot liquid into the inner end of the one compartment for flow through the ground coffee body toward the outer end of the one compartment and from there into the other compartment; discharging liquid from the other compartment at the inner end of the latter for the liquid to form respective columns in the compartments under the influence of the centrifugal forces in the form of a liquid trap; and controlling the rate of introduction of the hot liquid into the one compartment to thereby determine the dwell time of the liquid in contact with the ground coffee and thus the degree of extraction of soluble substances therefrom.

The novel features which are considered as characteristic of the invention are set forth in particular in the appended claims. The improved coffee-maker machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a partially cross-sectioned top plan view of the apparatus of FIG. 1; and FIG. 4 is a perspective view of a rotary body which can be used in the apparatus of FIG. 2, together with a cartridge containing a quantity of ground coffee.

DETAILED DESCRIPTION OF PREFERRED EMBODIMENTS

Figure 1:
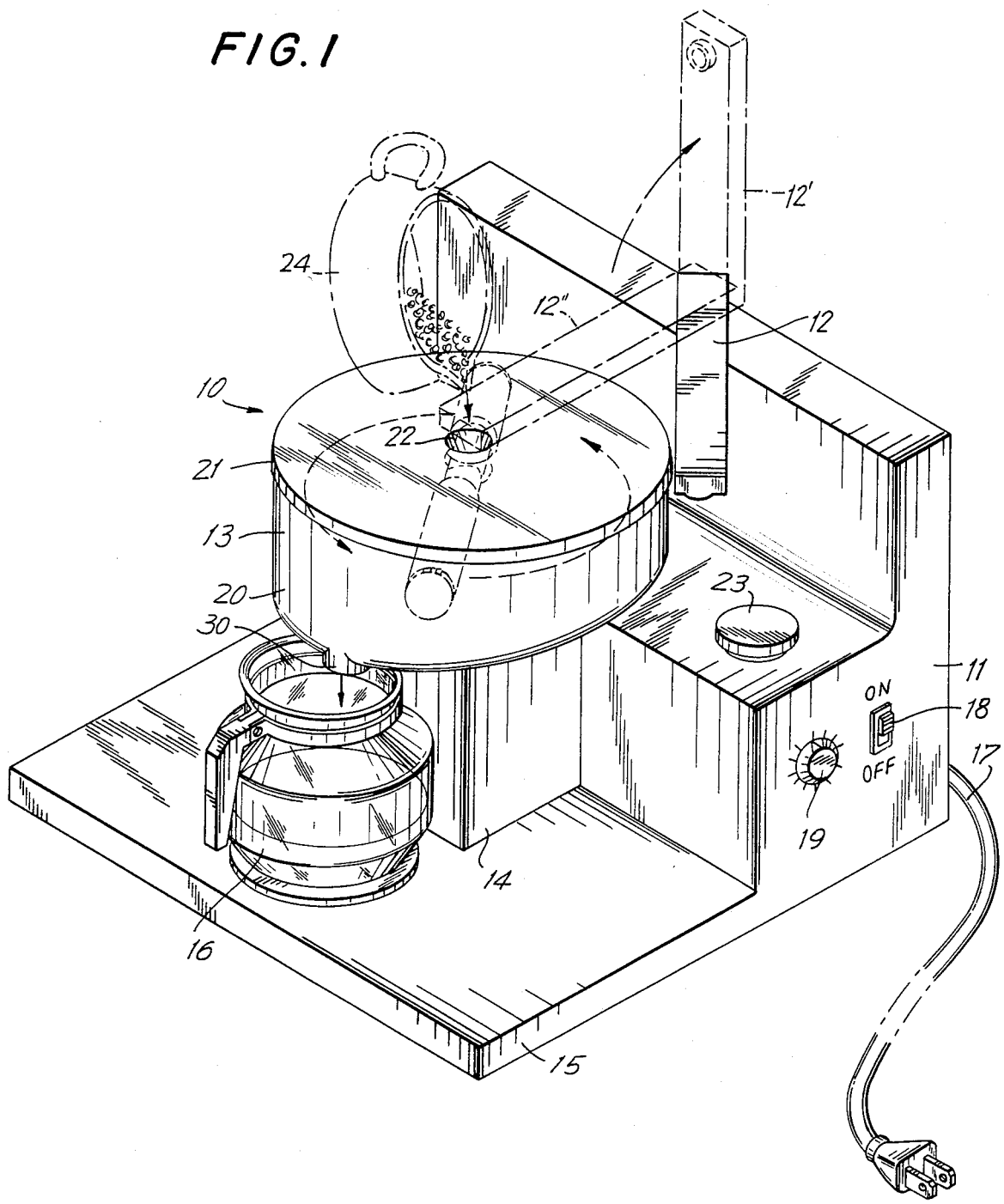
FIG. 1 is a perspective overall view of the coffee making apparatus according to the invention, shown while ground coffee is being poured thereinto.

Referring now to the drawing in detail, and first to FIG. 1 thereof, it may be seen that the reference numeral 10 has been used therein to identify a coffee-making apparatus according to the present invention in its entirety. The apparatus 10 contains, as its main components, heating chamber casing 11, an arm 12 mounted on the heating chamber casing 11, a catch chamber housing 13, a pedestal 14, a base or platform 15 and a coffee pot or receptacle 16. An electric cord 17 is provided which can be plugged into an electric outlet to supply electric current to the apparatus 10. The operation of the apparatus 10 is controlled by an on-off switch 18 and by an adjustment knob 19 which operate in a conventional manner that will not be discussed herein in any detail. The catch chamber housing 13 includes a cylindrical vessel 20 and a removable lid 21 which is provided with a central opening 22. The heating chamber casing 11 is provided with an opening which is closed by a plug 23 and through which water can be poured into the interior of the heating chamber casing 11 after the removal of the plug 23. A measuring cup 24 is shown to be used for pouring coffee into the interior of the catch member housing 13 through the central opening 22 of the lid 21. To render this possible, the arm 12 is moved out of the way, either into its spaced horizontal position shown in solid lines, or into its spaced upright position 12' shown in phantom lines. However the arm 12 can be moved into its operative position, shown in heavy dash-dotted lines and indicated by the reference numeral 12'', in which the arm 12 extends to above the opening 22.

Figure 2:
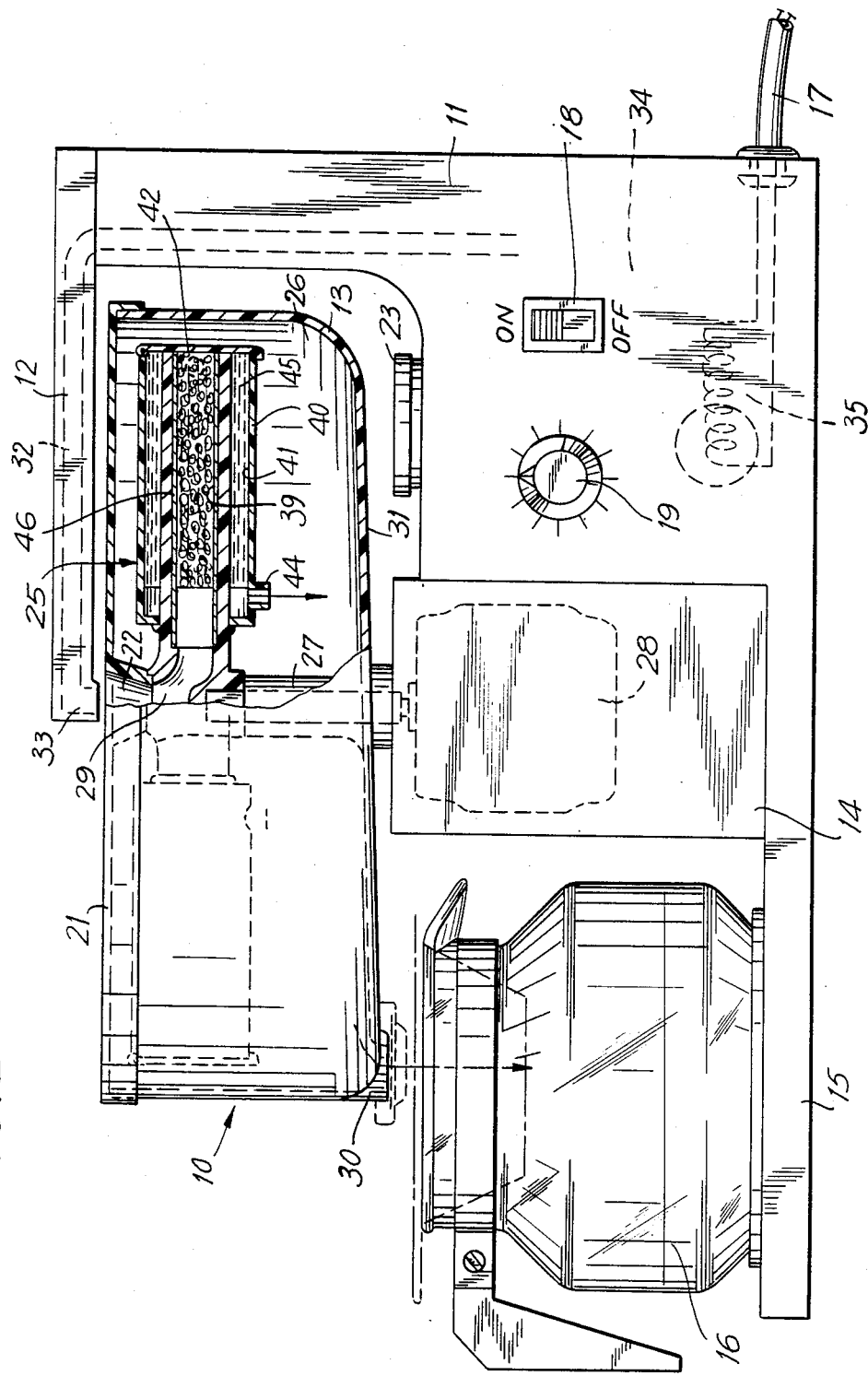
FIG. 2 is a partially sectioned side elevational view of the apparatus of FIG. 1.

As illustrated in FIG. 2, a rotary body 25 is accommodated in a catch chamber 26 of the housing 13. The rotary body 25 is mounted on a shaft 27 for joint rotation therewith. The shaft 27 is driven in rotation by a motor 28 accommodated in the pedestal 14. The rotary body 25 has a central recess 29 which is aligned with the opening 22 of the lid 21. It may also be seen that the opening 22 has a substantially funnel-shaped configuration.

The housing 13 further includes a discharge spout 30 through which any liquid present in the catch chamber 26 is discharged into the receptacle 16. To this end, a bottom wall 31 of the housing 13 gently slopes downwardly toward the discharge spout 30. Because of this discharge of liquid, the rotary body 25 spins in air when the motor 28 is energized. It may also be seen in FIG. 2 that the arm 12 has an internal passage 32 which terminates at the free end of the arm 12 in a downwardly directed outlet port 33 and which communicates with a heating chamber 34 of the casing 11. The outlet port 33 is aligned with the opening 22 in the operative position illustrated in FIG. 2, so that water flowing through the passage 32 from the heating chamber 34 will be delivered through the opening 22 into the recess 29 of the rotary body 25. The water contained in the heating chamber 34 is heated by an only diagrammatically indicated heating element 35.

As shown particularly in FIG. 4, the rotary body 25 includes two radially extending sections 36 and 37 which are identical in construction and configuration to make the rotary body 25 substantially statically and dynamically balanced with respect to its axis of rotation, consequently, only the structural features of the section 36 will now be described in conjunction particularly with FIG. 3, it being understood that the section 37 is provided with the same features.

The section 36 includes a tubular inner portion 38 which bounds a compartment 39 that communicates with the recess 29 and extends radially outwardly therefrom, and an outer jacket 40 which is mounted on or formed integrally with the inner portion 38 and surrounds at least a predominant portion of the compartment 39 with a spacing from the inner portion 38 in the radial direction, to bound another compartment 41. The jacket 40 includes an end wall 42 which delimits the other compartment 41 at its radially outer end, but which also serves to delimit the compartment 39 at its radially outer end. It will be understood that, when reference is being had to a radial direction, this refers to the axis of rotation of the rotary body 25, rather than to the axis of the section 36 or 37.

The compartments 39 and 41 are in communication with one another at their radially outer ends, as illustrated, via an orifice 43. The outer jacket 40 is provided, as best seen in FIG. 2, with a downwardly pointing discharge port 44 through which liquid present in the other compartment 41 can be discharged into the catch chamber 26. It will be noted that the discharge port 44 is arranged at the radially inner end of the compartment 41 so that the compartment 41 will be emptied through the port 44 only when the rotary body is at a standstill. On the other hand, once the rotary body 25 rotates or spins about the axis of the driving shaft 27, the centrifugal forces attending such spinning will act on the liquid present in the compartment 41 and urge the same radially outwardly, so that a body of liquid 45 will remain in the compartment 41 for so long as the rotary body 25 spins about the axis of rotation thereof. Of course, the quantity of the liquid in the liquid body 45 may vary, as may the shape or angle of inclination of the radially inner surface delimiting the liquid body 45, in dependence on the speed or rotation of the rotary body 25 about its axis of rotation; yet, some of such liquid will remain in the compartment 41 to act as a water trap, in accordance with well-known principles. This means that the liquid will also back up in the compartment 39, substantially to the level of the port 44 or somewhat closer to the axis of rotation, depending on the resistance encountered by the liquid in the compartment 39 and in the connecting orifice 43. Obviously, once the rotary body 25 comes to a standstill, the liquid will drain from the compartment 39 into the compartment 41 through the orifice 43, and will leave the compartment 41 through the port 44 into the catch chamber 26.

The compartment 39 is shown to be lined by a filter 46 which acts as a barrier that lets the liquid flow therethrough from the compartment 39 into the compartment 41 via the orifice 43, but that retains coffee grounds in the compartment 39. As mentioned above, the ground coffee can be introduced into the recess 29 by means of the measuring cup 24 and will propagate into the compartment 39 at the beginning of the coffee-making operation due to centrifugal forces attending the spinning of the rotary body 25 about its axis of rotation. However, as shown particularly in FIG. 4, the filter 46 may be used to confine a quantity 47 of ground coffee in its confines to begin with, thus forming a replaceable cartridge which is introduced into the compartment 39 as a unit. To this end, the end wall 42 is displaceably mounted on the remainder of the jacket 40, for instance, by being pivotally connected thereto by a hinge 48 and is retained in its closed position by appropriate means, such as a catch 49 shown in FIG. 4. In the alternative, the end wall 42 may be constructed, as indicated in FIG. 2, as a simple snap-on lid. In any event, the end wall 42 must be held in its closed position with sufficient force to avoid the possibility that it would be flung against the housing 13 by centrifugal forces acting thereon, and thus let the coffee grounds and hot liquid leave the interior of the section 36 or 37 through the now open end of the compartment 39 or 41.

Having so described the construction of the arrangement of the present invention, its operation will now be briefly discussed, to the extent that it has not been yet.

Starting with the situation where the filter 46 and the ground coffee quantity 47 have been introduced into the compartment 39 in one or the other of the above-discussed ways, that is, as a prefabricated cartridge, or the filter 46 first and then the coffee quantity 47 which enters the recess 29 first and then propagates into the compartment 39, the rotary body 25 is brought in rotation about the axis of the shaft 27 by energizing the motor 28. At first, there is no liquid in the compartments 39 and 41 so that the ground coffee is merely compacted in the body 47, if not provided as the compacted body in the cartridge to begin with. Then, hot water is introduced into the recess 29 through the arm 12 while the spinning of the rotary body 25 about the axis of the shaft 27 is continued. The liquid is subjected to centrifugal forces and hence is forced to flow through the coffee body 47 from the inner end to the outer end of the compartment 39. Once the hot water, which by now has soluble ingredients of the ground coffee entrained therein and thus forms a coffee extract or beverage, reaches the orifice 43, it will flow therethrough into the compartment 41 and will start to gradually fill the latter from the outer end toward the inner end of the compartment 41. The filling will take place substantially under equilibrium conditions, that is, the liquid will not reach the port 44 until it has backed up in the compartment 39 to the commensurate extent. However, once the liquid has reached the port 44, it will be discharged therethrough. Yet, the rate of discharge, rather than being determined by the centrifugal forces and thus by the speed of spinning of the rotary body 25, is determined by the rate at which additional liquid is introduced into the recess 29. This is so because of the above-mentioned operation under substantially equilibrium conditions: the level of the liquid in the compartment 41 cannot reach or stay at a location any closer to the axis of rotation than the port 44 for any protracted period of time, since then it will be discharged through the port 44. On the other hand, the pressure of the liquid in the compartment 39 must be sufficient to overcome the friction encountered as the liquid flows through the compacted coffee grounds body 47 and move before the liquid level in the compartment 41 can move toward the port 44. This means that the column of liquid in the compartment 39 must be at least as long as, but probably longer than, the column of liquid in the compartment 41. Taken together, this means that a quantity of liquid can be discharged through the port 44 only after the same quantity of liquid has been added to the quantity of liquid already present in the compartments 39 and 41 reaching just short of the requisite discharge level. Now, since the rate of addition of hot water into the recess 29 can be easily controlled, unlike the rate of flow through the body 47 which was determinative of the dwell time of the hot water in contact with the coffee grounds in the known continuous-flow coffee makers, it is now possible to accurately control the degree of extraction of the coffee flavor from the ground coffee present in the compartment 39, by controlling the rate of flow of the hot water into the recess 29. Put another way, the rate of exit of the coffee extract is independent of the centrifugal forces. The centrifugal forces are employed primarily to cause the water column in compartment 39 to move as a mass towards the downstream end thereof and thereby flow around and through the coffee grounds therein and, in addition, to stabilize the liquid columns in the compartments 39 and 41 and, in effect, counterbalance the force of gravity which is constantly acting on the liquids in the compartments 39 and 41.

Once the compartments have been loaded with the initial quantity of liquid, the additional quantity can be admitted at an easily controlled rate, and preferably at a rate slower than would be the case for prior art coffee makers. The admission of prior art coffee makers was essentially determined solely by the user. However, the admission rate of the present invention is directly responsive to the desired flow rate through the coffee grounds.

Although the double compartment design described above is currently preferred, it is the only arrangement that could be employed. The second compartment 41 could be replaced by any means for creating a backpressure in the first compartment 39 to surround the coffee grounds in the latter with liquid during the rotation at centrifugal speeds. For example, the downstream outer end portion of the compartment 39 in which the coffee grounds are contained could be provided with a small discharge orifice properly sized to restrain, but not completely prevent, any water admitted into compartment 39 from being discharged therefrom during the rotation at centrifugal speeds. At equilibrium conditions, the small discharge orifice would permit a lesser amount of coffee extract to be discharged from compartment 39 than the quantity of water that is being admitted thereto, thus creating a backpressure and maintaining a column of liquid which constantly keeps the grounds wetted during the rotation at centrifugal speeds.

By way of another non-limiting example, rather than employing a small discharge orifice that is constantly open, and thereby subject to clogging, an exit opening in which an intermittently-operable valve is located may be used. The rate of opening and closing the exit opening can be controlled so that the amount of coffee extract discharged from compartment 39 is incremental so that the water column can be allowed to completely or partially empty intermittently; thus, portions of the coffee grounds will be alternately submerged or drained. This can be matched to the admission rate. A backpressure is created sufficient to maintain a liquid column in the compartment 39 to constantly submerge the grounds therein during the rotation at centrifugal speeds.

In the double compartment design, the constantly-open discharge orifice design, and the intermittently-open exit opening design, the centrifugal forces acting on the coffee grounds in compartment 39 are used primarily to cause the water admitted therein to flow in a straight radial line therethrough, and particularly forcefully through the normally dry centers of the individual coffee grounds. The coffee grounds themselves are, in fact, submerged in the liquid surrounding the grounds, said liquid being maintained in position by the backpressure generated by either the second compartment (water trap), the constantly-open discharge orifice, or the intermittently-open exit opening. The backpressure controls the dwell time of the admitted liquid in the compartment 39. The passage of the liquid through the centers of the submerged coffee grounds, rather than only around them, provides not only for a higher degree of coffee extraction, but also eliminates any channeling or bypassing of the coffee grounds as in prior art coffee makers where the coffee grounds were not submerged.

The use of replaceable cartridges facilitates their removal and the easy cleaning of the apparatus. If cartridges are not used, then the removal of the spent coffee grounds is facilitated by rotating the rotary body with the end lids deliberately left open.

The same centrifugal speed need not be used throughout the coffee-making cycle, but different speeds of rotation for different portions of the cycle could be employed.

It will be understood that each of the elements described above, or two or more together, may also find a useful application in other types of arrangements differing from the type described above. So, for instance, the rotary body 25 could be configured as a disc centered on the axis of rotation and provided with one or more of the compartments 39, and one or more of the compartments 41 adjoining the same in the circumferential or axial direction and communicating therewith through the respective orifice or orifices. In another arrangement, rather than configurating the second compartment 41 as an outer tubular jacket surrounding the first compartment 39, the second compartment 41 could be shaped as a radially-extending pipe.

While the invention has been illustrated and described as embodied in a continuous-flow coffee-making apparatus, it is not limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A coffee-making apparatus, comprising
   a housing bounding a catch chamber;
   a rotary body mounted with clearance in said catch chamber for rotation in air about an axis, bounding a centrally located recess and at least one enclosed internal space extending outwardly from said recess, and including substantially radially extending partitioning wall means subdividing said internal space into at least two compartments each of which has an inner and an outer end portion as considered in the radial direction, the inner end portion of at least one of which opens into said recess, and which are in communication with one another at said outer end portions thereof, and outlet port means arranged at the inner end portion of the other of said compartments and establishing communication between the latter and said catch chamber;
   means for introducing ground coffee into said one compartment;
   means for rotating said body in air about said axis to subject the contents of said rotary body to the influence of centrifugal forces;
   means for delivering hot liquid into said recess at least during the operation of said rotating means for the liquid to flow under the influence of said centrifugal forces into and through said one compartment and the quantity of coffee present in the latter with attendant formation of a coffee beverage, and for the coffee beverage to gradually fill said other compartment from the outer end portion to said outlet port means, also under the influence of said centrifugal forces, and to be discharged through said outlet port means only after reaching the same;
   a receptacle for the coffee beverage discharged from said outlet port means; and
   means for continuously discharging said coffee beverage from said catch chamber to prevent accumulation of such beverage in said catch chamber.

2. The apparatus as defined in claim 1, wherein said rotary body has a substantially cylindrical configuration centered on a central axis normal to said axis of rotation and including an outer jacket; and wherein said partitioning wall means is a tubular portion centered on said central axis which outwardly bounds said one compartment and is surrounded by said other compartment that is outwardly delimited by said jacket.

3. The apparatus as defined in claim 2, wherein said outer jacket includes a circumferential wall and an end wall, said end wall being separate from said circumferential wall and movably retained thereon.

4. The apparatus as defined in claim 3, wherein said jacket further includes hinge means which connects said end wall to said circumferential wall of said jacket for pivoting relative thereto.

5. The apparatus as defined in claim 3, wherein said introducing means includes a cartridge including an outer envelope of a material pervious to liquids but impervious to coffee grounds, and a body of coffee grounds confined in said outer envelope, said cartridge being introducible into said one compartment as a unit through said outer end portion when said end wall is moved out of the way.

6. A coffee-making apparatus, comprising:
   a housing bounding a catch chamber;
   a rotary body mounted with clearance in said catch chamber for rotation in air about an axis, said body including a centrally located recess and at least one enclosed internal space extending outwardly from said recess, said body also including substantially radially extending partitioning wall means subdividing said internal space into at least two compartments each of which has an inner and an outer end portion as considered in the radial direction, the inner end portion of at least one of said compartments opening into said recess, said compartments being in communication with one another at said outer end portions thereof, and outlet port means arranged at the inner end portion of the other of said compartments and establishing communication between the latter and said catch chamber;
   means for introducing ground coffee into said one compartment;
   means for rotating said body in air about said axis to subject the contents of said rotary body to the influence of centrifugal forces;
   means for loading an initial quantity of hot liquid into said recess at least during the operation of said rotating means for the liquid to flow under the influence of said centrifugal forces into and through said one compartment and the quantity of coffee present in the latter with attendant formation of a coffee beverage, and for the coffee beverage to gradually fill and be retained in said other compartment from the outer end portion to said outlet port means, also under the influence of said centrifugal forces;
   means for delivering an additional quantity of hot liquid at a predetermined rate into said recess and said compartments during the operation of said rotating means and after loading of the initial quantity, for discharge of the coffee beverage through said outlet port means at said predetermined rate, said rate being substantially independent of the influence of said centrifugal forces;
   a receptacle for the coffee beverage discharged from said outlet port means; and means for continuously discharging said coffee beverage from said catch chamber to prevent accumulation of such beverage in said catch chamber.

7. A coffee-making apparatus, comprising:

a housing bounding a catch chamber;

a rotary body mounted with clearance in said catch chamber for rotation in air about an axis, bounding a centrally located recess, and having wall means bounding an enclosed internal space which extends radially outwardly from said recess, and which communicates with said catch chamber;

means for introducing ground coffee into said internal space;

means for rotating said body in air about said axis to subject the contents of said rotary body to the influence of centrifugal forces;

means for delivering hot liquid into said recess at least during the operation of said rotating means for the liquid to flow under the influence of said centrifugal forces into and through said internal space and the quantity of coffee present in the latter with attendant formation of a coffee beverage;

trap means for generating a backpressure in said internal space to maintain the ground coffee therein submerged in the liquid during the operation of said rotating means;

means for discharging the coffee beverage formed in the internal space to said catch chamber; and means for collecting the discharged coffee beverage from said catch chamber to prevent accumulation of such beverage in said catch chamber.

* * * * *